(12) United States Patent
Chien (10) Patent No.: US 8,972,264 B2
(45) Date of Patent: Mar. 3, 2015

(54) METHOD AND APPARATUS FOR UTTERANCE VERIFICATION

(71) Applicant: Industrial Technology Research Institute, Hsinchu (TW)

(72) Inventor: Shih-Chieh Chien, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 205 days.

(21) Appl. No.: 13/717,645

(22) Filed: Dec. 17, 2012

(65) Prior Publication Data

US 2014/0129224 A1    May 8, 2014

(30) Foreign Application Priority Data

Nov. 8, 2012    (TW) .............................. 101141672 A (51) Int. Cl.
*G10L 15/00*    (2013.01)
(52) U.S. Cl.
USPC ............................ 704/251; 704/225; 704/257
(58) Field of Classification Search
USPC ......................................... 704/251, 255, 257
See application file for complete search history.

(56) References Cited

U.S. PATENT DOCUMENTS

| | | | |
|---|---|---|---|
| 5,675,706 A | 10/1997 | Lee et al. | |
| 5,950,159 A * | 9/1999 | Knill ............................ | 704/251 |
| 6,618,702 B1 * | 9/2003 | Kohler et al. ................ | 704/250 |
| 7,502,736 B2 | 3/2009 | Hong et al. | |
| 7,720,683 B1 | 5/2010 | Vermeulen et al. | |
| 8,050,925 B2 * | 11/2011 | Rahim et al. ................ | 704/256.5 |
| 8,374,869 B2 * | 2/2013 | Kang et al. .................... | 704/251 |
| 2009/0150153 A1 | 6/2009 | Li et al. | |
| 2013/0274632 A1 | 10/2013 | Tanaka et al. | |

FOREIGN PATENT DOCUMENTS

| | | |
|---|---|---|
| CN | 1835076 | 9/2006 |
| TW | 517221 | 1/2003 |
| TW | 200421261 | 10/2004 |
| TW | I223791 | 11/2004 |
| TW | 200926142 | 6/2009 |
| TW | 201113869 | 4/2011 |
| TW | 201135716 | 10/2011 |

OTHER PUBLICATIONS

Rivlin et al, "A Phone-Dependent Confidence Measure for Utterance Rejection," IEEE International Conference on Acoustics, Speech, and Signal Processing 1, May 7-10, 1996, pp. 515-517.

(Continued)

*Primary Examiner* — Daniel D Abebe
(74) *Attorney, Agent, or Firm* — Jianq Chyun IP Office (57) ABSTRACT

A method and apparatus for utterance verification are provided for verifying a recognized vocabulary output from speech recognition. The apparatus for utterance verification includes a reference score accumulator, a verification score generator and a decision device. A log-likelihood score obtained from speech recognition is processed by taking a logarithm of the value of the probability of one of feature vectors of an input speech conditioned on one of states of each model vocabulary. A verification score is generated based on the processed result. The verification score is compared with a predetermined threshold value so as to reject or accept the recognized vocabulary.

16 Claims, 2 Drawing Sheets

(56) References Cited

OTHER PUBLICATIONS

Bernardis et al., "Improving Posterior Based Confidence Measures in Hybrid HMM/ANN Speech Recognition Systems," Proceedings of ICSLP'98, Aug. 1998, pp. 1-7.

Rahim et al., "Discriminative Utterance Verification for Connected Digits Recognition," IEEE Transactions on Speech and Audio Processing 5 (3), May 1997, pp. 266-277.

Sukkar et al., "Vocabulary Independent Discriminative Utterance Verification for Nonkeyword Rejection in Subword Based Speech Recognition," IEEE Transaction on Speech and Audio Processing 4 (6), Nov. 1996, pp. 420-429.

Sheryl R. Young, "Detecting Misrecognitions and Out-of-Vocabulary Words," IEEE International Conference on Acoustics, Speech, and Signal Processing 2, Apr. 19-22, 1994, pp. II-21-II-24.

Cox et al., "Confidence Measures for the Switchboard Database," IEEE International Conference on Acoustics, Speech, and Signal Processing 1, May 7-10, 1996, pp. 511-514.

David A. James, "A System for Unrestricted Topic Retrieval From Radio News Broadcasts," IEEE International Conference on Acoustics, Speech, and Signal Processing 1, May 7-10, 1996, pp. 279-282.

Rose et al., "A Hidden Markov Model Based Keyword Recognition System," IEEE International Conference on Acoustics, Speech, and Signal Processing 1, Apr. 3-6, 1990, pp. 129-132.

Rohlicek et al., "Continuous Hidden Markov Modeling for Speaker-Independent Word Spotting," IEEE International Conference on Acoustics, Speech, and Signal Processing 1, May 23-26, 1989, pp. 627-630.

Jeanrenaud et al., "Phonetic-Based Word Spotter: Various Configurations and Application to Event Spotting," 3rd European Conference on Speech Communication and Technology, Sep. 19-23, 1993, pp. 1057-1060.

Mitchel Weintraub, "LVCSR Log-Likelihood Ratio Scoring for Keyword Spotting," IEEE International Conference on Acoustics, Speech, and Signal Processing 1, May 9-12, 1995, pp. 297-300.

Wessel et al., "Using Word Probabilities As Confidence Measures," IEEE International Conference on Acoustics, Speech, and Signal Processing 1, May 12-15, 1998, pp. 225-228.

* cited by examiner

METHOD AND APPARATUS FOR UTTERANCE VERIFICATION

CROSS-REFERENCE TO RELATED APPLICATION

This application claims the priority benefit of Taiwan application serial no. 101141672, filed on Nov. 8, 2012. The entirety of the above-mentioned patent application is hereby incorporated by reference herein and made a part of this specification.

BACKGROUND

1. Technical Field

The disclosure relates to a technique of utterance verification.

2. Related Art

Speech recognition has a wide range of applications such as phone number inquiry systems, building access control systems, vehicle computer systems, voice control toys, and wireless communication devices that are the most popular in recent years. The most representative structure of the current speech recognition system is mainly based on a hidden Markov model (HMM). Although speech recognition provides such a wide range in applications, correctness of speech recognition hardly promotes the popularity thereof. Therefore, most researches on the speech recognition still focus on improvements of the correctness.

An utterance verification feature, an indispensable part of a speech recognition system, may effectively reject incorrect results of speech recognition caused by out-of-vocabulary voices or noises to improve correctness and reliability of the speech recognition. A commonly used technique is to perform utterance verification on a recognized vocabulary by using a Neural Network Model, garbage normalization, or N-best based confidence, etc.

However, the above utterance verification techniques require additional computations and sufficient memory space for storing models, or require to adjust a setting according to different environments. Therefore, it is needed to provide a method for utterance verification with a better effect and less computation and memory space.

SUMMARY

The disclosure provides a method for utterance verification, which is adapted to verify a recognized vocabulary output from speech recognition, wherein the recognized vocabulary is obtained by performing speech recognition on a feature vector sequence according to an acoustic model and model vocabulary database. The feature vector sequence includes feature vectors of a plurality of frames. The acoustic model and model vocabulary database includes a plurality of model vocabularies, wherein each of the model vocabularies includes a plurality of states. In the method for utterance verification, a log-likelihood score obtained from speech recognition is processed, wherein the log-likelihood score is obtained by taking a logarithm on a value of a probability of one of the feature vectors of the frames conditioned on one of the states of each model vocabulary. Then, a verification score is generated based on a processed result, and the verification score is compared with a predetermined threshold value, so as to reject or accept the recognized vocabulary.

The disclosure provides an apparatus for utterance verification, which is adapted to verify a recognized vocabulary output from a speech recognition device, wherein the recognized vocabulary is obtained by performing speech recognition on a feature vector sequence according to an acoustic model and model vocabulary database.

The feature vector sequence includes feature vectors of a plurality of frames. The acoustic model and model vocabulary database includes a plurality of model vocabularies, wherein each of the model vocabularies includes a plurality of states. The apparatus for utterance verification includes a reference score accumulator, a verification score generator, and a decision device. The reference score accumulator is coupled to the speech recognition device and is adapted to process a log-likelihood score obtained from speech recognition performed by the speech recognition device, wherein the log-likelihood score is obtained by taking a logarithm on a value of a probability of one of the feature vectors of the frames conditioned on one of the states of each model vocabulary. The verification score generator is coupled to the reference score accumulator and adapted to generate a verification score based on a processed result of the reference score accumulator. The decision device is coupled to the verification score generator and adapted to compare the verification score with a predetermined threshold value, so as to reject or accept the recognized vocabulary.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Embodiments of the disclosure are described below with reference of figures. These embodiments are only a part of applicable embodiments of the disclosure, and are not used to limit the disclosure. More precisely, these embodiments are only examples of the apparatus and method in claims of the disclosure.

Figure 1:
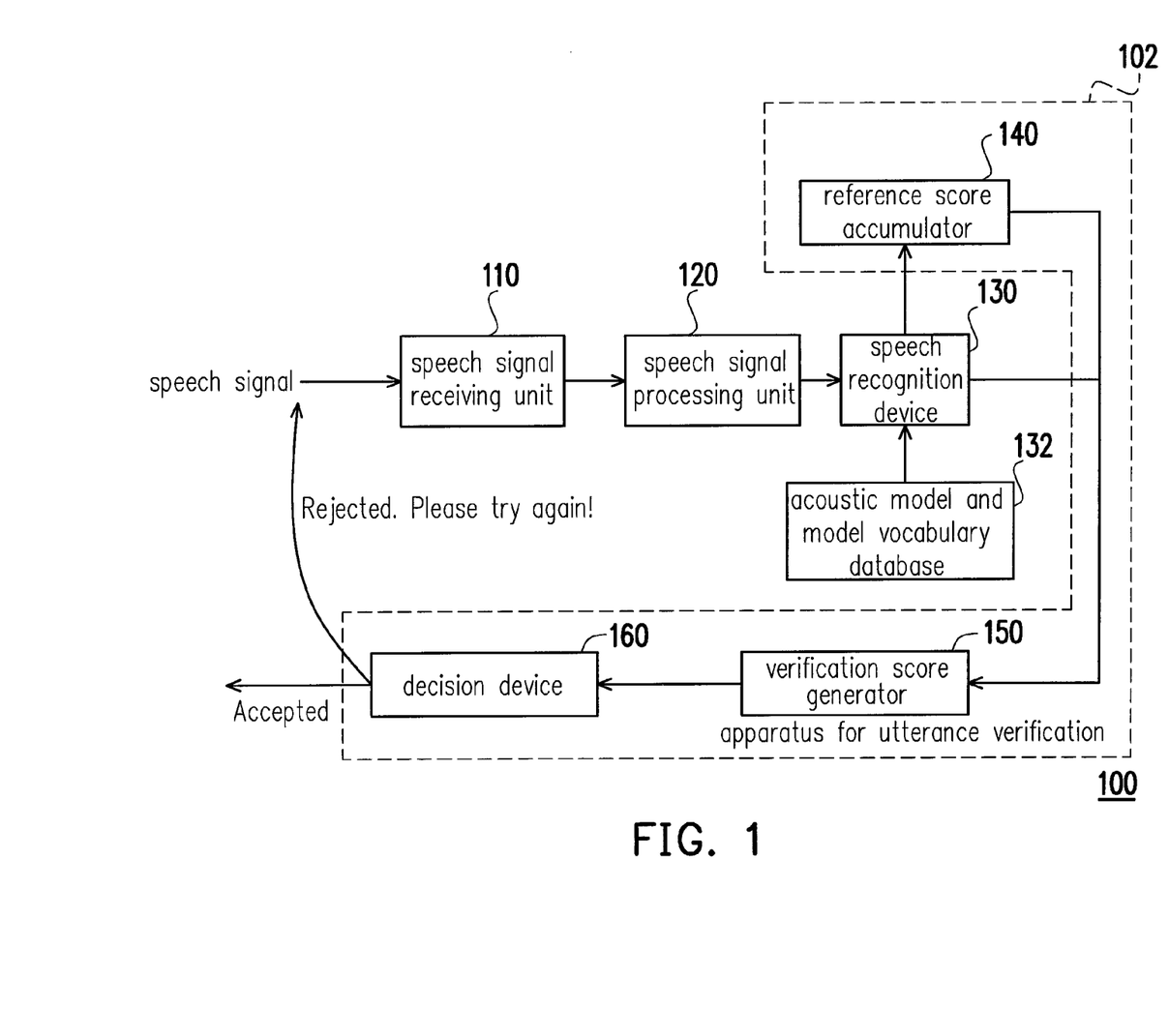
FIG. 1 is a block schematic diagram of a speech recognition system according to an embodiment of the disclosure.
Figure 2:
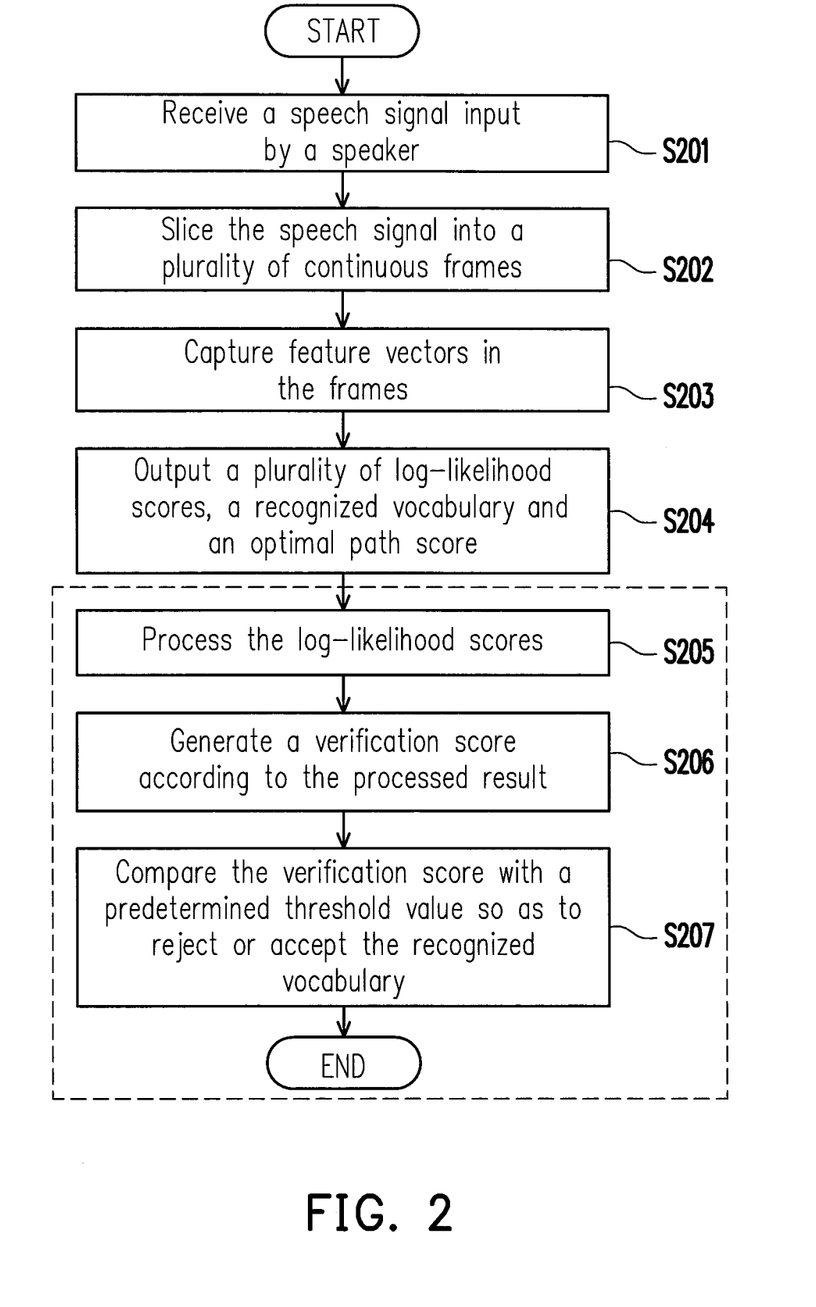
FIG. 2 is a flowchart illustrating a speech recognition method according to an embodiment of the disclosure.

FIG. 1 is a block schematic diagram of a speech recognition system according to an embodiment of the disclosure, and FIG. 2 is a flowchart illustrating a speech recognition method according to an embodiment of the disclosure, which are only used for descriptions but not intend to limit the disclosure. Referring to FIG. 1, the speech recognition system 100 includes a speech signal receiving unit 110, a speech signal processing unit 120, a speech recognition device 130, an acoustic model and model vocabulary database 132 and an apparatus for utterance verification 102. The apparatus for utterance verification 102 includes a reference score accumulator 140, a verification score generator 150, and a decision device 160.

The aforementioned components are briefly introduced first. The details will be described along with the flow of the method of speech recognition of FIG. 2 later. After a speech signal is input to the speech recognition system 100, it is sequentially transmitted through the speech signal receiving unit 110, the speech signal processing unit 120 and the speech recognition device 130. The speech recognition device 130 recognizes a recognized vocabulary according to the acoustic model and model vocabulary database 132 and outputs one or a plurality of log-likelihood scores, which are further transmitted to the reference score accumulator 140 and the verification score generator 150 coupled to the speech recognition device 130 respectively. The reference score accumulator 140 processes the log-likelihood score and transmits a processed result to the verification score generator 150 coupled thereto. The verification score generator 150 generates a verification score according to the processed result and transmits the verification score to the decision device 160 coupled thereto. The decision device 160 compares the verification score with a predetermined threshold value so as to accept or reject the recognized vocabulary.

Referring to FIG. 1 and FIG. 2, detailed steps of the speech recognition method of FIG. 2 are described below with reference of each component of the speech recognition system 100 of FIG. 1.

First, the speech signal receiving unit 110 receives a speech signal input by a speaker and transmits the speech signal to the speech signal processing unit 120 (step S201). Then, the speech signal processing unit 120 slices the speech signal into a plurality of continuous frames (step S202). Each of the frames may be represented by multi-dimensional Mel-frequency cepstral coefficients (MFCC) and a feature vector of a time derivative of a first-order and second-order of the MFCC, wherein a reason of obtaining the time derivatives is to obtain related information of a feature of the speech frame in a temporal domain. The speech signal processing unit 120 extracts the feature vectors and transmits the feature vectors to the speech recognition device 130 (step S203). Then, the speech recognition device 130 recognizes a recognized vocabulary according to an extracted feature vector sequence and the acoustic model and model vocabulary database 132 containing a plurality of model vocabularies, and respectively outputs one or a plurality of log-likelihood scores, the recognized vocabulary and an optimal path score to the reference score accumulator 140 and the verification score generator 150 (step S204).

In order to process a variation of the speech signal in the temporal domain, generally, a plurality of left-to-right Hidden Markov Models (HMM) are used as the model vocabularies in the acoustic model and model vocabulary database 132, wherein each of the model vocabularies includes a plurality of states, and each state is, for example, represented by a plurality of Gaussian mixture distributions. For example, taking the vocabulary "forward" as an example, it may be a combination of vowels and consonants such as "silence", "f", "or", "war", "d", and "silence", each of which may be described by different number of states. For example, "silence" is described by one state, and models of "f", "or", "war", "d" are described by two states, so that one vocabulary may form a state sequence described by different vowels and consonants, wherein each of the states is described by a plurality of Gaussian mixture distributions. The Gaussian mixture distributions are estimated from feature vectors corresponding to training speeches. Therefore, according to the feature vectors obtained from the speech signal and the Gaussian mixture distributions corresponding to the state sequence, a value of the probability of each of the feature vectors conditioned on one of the states in the state sequence and a log-likelihood score are able to be calculated, wherein the log-likelihood score is obtained by taking a logarithm on the value of the probability function.

Moreover, the state sequence also restricts a sequence of comparing with the feature vector sequence. For example, a feature vector of a first frame of the feature vector sequence is required to be compared from the first state in the state sequence rather than from the third state. Moreover, in the feature vector sequence, the log-likelihood score obtained from the feature vector of a previous frame serves as a basis of the feature vector of a next frame and is accumulated to a log-likelihood score calculated from the feature vector of the next frame to obtain a path score. Therefore, according to such sequence, after the feature vectors of all of the frames in the feature vector sequence are compared with the state sequence of each model vocabulary, a plurality of path scores are obtained, wherein the maximum value thereof is the optimal path score, and the corresponding model vocabulary thereof is the aforementioned recognized vocabulary.

The optimal path score is a path score with the maximum sum of the log-likelihood scores of the feature vector sequence under the restriction of the state sequence. If there is no such restriction, i.e. the feature vector of each frame in the feature vector sequence may be compared with each of the states in the state sequence so as to generate a plurality of the log-likelihood scores, the log-likelihood scores are transmitted to the reference score accumulator 140. Then, the reference score accumulator 140 processes the log-likelihood scores (step S205) and transmits a processed result to the verification score generator 150 to generate a verification score (step S206). In the following embodiments, the step S205 and the step S206 are further described in detail.

In the present embodiment, a log-likelihood score of the feature vector of each frame conditioned on each state of the recognized vocabulary is calculated, and then the maximum value of the calculated log-likelihood scores is obtained, i.e. the maximum log-likelihood score of the feature vector of each frame. Then, the reference score accumulator 140 accumulates the maximum log-likelihood score of each frame to obtain a maximum reference score corresponding to the recognized vocabulary. A reason of obtaining the maximum reference score is that if the input speech content is identical to the recognized vocabulary, when the states corresponding to the maximum log-likelihood scores of the feature vectors of the frames are connected to form a path, such path must be highly overlapped with the best path. Namely, if the maximum log-likelihood scores of the feature vectors of the frames are summed, the obtained maximum reference score is close to the value of the optimal path score. Therefore, the optimal path score and the maximum reference score are respectively transmitted to the verification score generator 150 from the speech recognition device 130 and the reference score accumulator 140 to generate the verification score.

In detail, if the maximum reference score is close to the optimal path score, a difference therebetween approximates to 0, and conversely, the difference there between is far away from 0. Moreover, since lengths of the input speech signals are not the same, a score normalization process is performed on the difference. The normalization processing method of the present embodiment is to define a normalization constant as a total number of the feature vectors, and yet the disclosure is not limited thereto. In other embodiments, a normalization processing method such as a min-max normalization may also be used. The generated verification score can be represented by the following equation:

$$CM_0 = \frac{\sum_{t=1}^{T} \max_{s_i \in w_m\{s_1, s_2, \ldots, s_{N_m}\}} [\log(Pr(o_t | s_i))] - \sum_{t=1}^{T} \text{optimal}_{s_i \in w_m\{s_1, s_2, \ldots, s_{N_m}\}} [\log(Pr(o_t | s_i))]}{T},$$

wherein, t is a frame sequence number of a feature vector in the feature vector sequence, $o_t$ is a feature vector of the frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, log ($Pr(o_t|s_i)$) is a log-likelihood score of the feature vector $o_t$ conditioned on the state $s_i$, $$\sum_{t=1}^{T} \max_{s_i \in w_m\{s_1, s_2, \ldots, s_{N_m}\}} [\log(Pr(o_t | s_i))]$$

is the maximum reference score corresponding to the model vocabulary m, and $$\sum_{t=1}^{T} \text{optimal}_{s_i \in w_m\{s_1, s_2, \ldots, s_{N_m}\}} [\log(Pr(o_t | s_i))]$$

is the optimal path score.

In the above embodiment, the maximum log-likelihood score and the maximum reference score obtained in the step S205 and the step 206 are only obtained in allusion to the specific recognized vocabulary that is recognized by the speech recognition device. In another embodiment of the disclosure, there is no such restriction, i.e. the feature vector of each frame is compared with the states corresponding to all of the model vocabularies in the acoustic model and model vocabulary database 132. The log-likelihood score of the feature vector of each frame conditioned on each of the states in all of the model vocabularies is calculated, and then the maximum value of the calculated log-likelihood scores, i.e. the maximum log-likelihood score of each of the feature vectors, is obtained. Then, the reference score accumulator 140 accumulates the maximum log-likelihood scores to obtain the overall maximum reference score corresponding to the recognized vocabulary. Similarly, if the input speech content is identical to the recognized vocabulary, when the states corresponding to the maximum log-likelihood scores of the feature vectors of the frames are connected to form a path, such path must be highly overlapped with the best path. Namely, if the maximum log-likelihood scores of the feature vectors of the frames are summed, the obtained overall maximum reference score is close to the value of the optimal path score. The optimal path score and the overall maximum reference score are respectively transmitted to the verification score generator 150 from the speech recognition device 130 and the reference score accumulator 140 to generate the versification score to verify the recognized vocabulary. The generated verification score can be represented by the following equation:

$$CM_1 = \frac{\sum_{t=1}^{T} \max_{s_i \in w_{m,m=1,2,\ldots,M}\{s_1, s_2, \ldots, s_{N_m}\}} [\log(Pr(o_t | s_i))] - \sum_{t=1}^{T} \text{optimal}_{s_i \in w_m\{s_1, s_2, \ldots, s_{N_m}\}} [\log(Pr(o_t | s_i))]}{T},$$

wherein, t is a frame sequence number of a feature vector in the feature vector sequence, $o_t$ is a feature vector of the frame with the sequence number t, T is a total frame number of the feature vectors, $s_i$ is one of the states of a model vocabulary m, $w_n, \{s_1, s_2, \ldots, s_{N_m}\}$, is a set composed of the states of the model vocabulary m, M is a total number of the model vocabularies, $\log(Pr(o_t|s_i))$ is a log-likelihood score of the feature vector $o_t$ conditioned on the state $s_i$, $$\sum_{t=1}^{T} \max_{s_i \in w_{m,m=1,2,\ldots,M}\{s_1, s_2, \ldots, s_{N_m}\}} [\log(Pr(o_t | s_i))]$$

is the overall maximum reference score, and $$\sum_{t=1}^{T} \text{optimal}_{s_i \in w_m\{s_1, s_2, \ldots, s_{N_m}\}} [\log(Pr(o_t | s_i))]$$

is the optimal path score.

In the above two embodiments, the optimal path score is compared with the maximum reference score and the overall maximum reference score, and in another embodiment, in the step S205 and the step S206, the optimal path score can also be compared with a garbage model. The so-called garbage model may, for example, re-train states of all of the vowels and consonants into a single state. Namely, the log-likelihood score of the feature vector of each frame is conditioned on the single state of the garbage model is calculated and transmitted to the reference score accumulator 140 for accumulation, so as to obtain a garbage score. The optimal path score and the garbage score are respectively transmitted to the verification score generator 150 from the speech recognition device 130 and the reference score accumulator 140. Moreover, in the present embodiment, the processing method of a score normalization is to take a difference between the overall maximum reference score of the previous embodiment and the garbage score as a normalization constant. Therefore, the reference score accumulator 140 also accumulates the maximum log-likelihood scores of each frame to obtain the overall maximum reference score and transmits the same to the verification score generator 150. The method for generating the overall maximum reference score has been described in the previous embodiment, so that details thereof are not repeated.

The verification score generated by the verification score generator 150 can be represented by the following equation:

$$CM_2 = \frac{\sum_{t=1}^{T} \underset{s_i \in w_m\{s_1, s_2, \ldots, s_{N_m}\}}{\text{optimal}} [\log(Pr(o_t | s_i))] - \sum_{t=1}^{T} \text{optimal}[\log(Pr(o_t | \lambda_g))]}{\sum_{t=1}^{T} \underset{s_i \in w_m, m=1,2,\ldots,M \{s_1, s_2, \ldots, s_{N_m}\}}{\max} [\log(Pr(o_t | s_i))] - \sum_{t=1}^{T} \text{optimal}[\log(Pr(o_t | \lambda_g))]},$$

wherein, t is a frame sequence number of a feature vector in the feature vector sequence, $o_t$ is a feature vector of the frame with the sequence number t, T is a total frame number of the feature vectors, $s_i$ is one of the states of a model vocabulary m, $\lambda_g$ is a state of the garbage model, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ conditioned on the state $s_i$, $\log(Pr(o_t|\lambda_g))$ is a log-likelihood score of the feature vector $o_t$ conditioned on the state of the garbage model, $$\sum_{t=1}^{T} \underset{s_i \in w_m, m=1,2,\ldots,M \{s_1, s_2, \ldots, s_{N_m}\}}{\max} [\log(Pr(o_t | s_i))]$$

is the overall maximum reference score, $$\sum_{t=1}^{T} \underset{s_i \in w_m\{s_1, s_2, \ldots, s_{N_m}\}}{\text{optimal}} [\log(Pr(o_t | s_i))]$$

is the optimal path score, and $$\sum_{t=1}^{T} \text{optimal}[\log(Pr(o_t | \lambda_g))]$$

is the garbage score.

In another embodiment of the disclosure, in the step S205 and the step S206, each of the feature vectors can also be compared with the states corresponding to all of the model vocabularies in the acoustic model and model vocabulary database 132, and the log-likelihood score of the feature vector of each frame conditioned on each of the states in all of the model vocabularies is calculated, and then a minimum value of the calculated log-likelihood scores, i.e. the minimum log-likelihood score of the feature vector of each of the frames, is obtained. Then, the reference score accumulator 140 accumulates the minimum log-likelihood scores to obtain an overall minimum reference score corresponding to the recognized vocabulary. The optimal path score and the overall minimum reference score are respectively transmitted to the verification score generator 150 from the speech recognition device 130 and the reference score accumulator 140. Moreover, the reference score accumulator 140 also accumulates each of the maximum log-likelihood scores to obtain the maximum reference score, which is further transmitted to the verification score generator 150, wherein the method for generating the overall maximum reference score has been described in the previous embodiment, so that details thereof are not repeated. The generated verification score can be represented by the following equation:

$$CM_3 = \frac{\sum_{t=1}^{T} \underset{s_i \in w_m\{s_1, s_2, \ldots, s_{N_m}\}}{\text{optimal}} [\log(Pr(o_t | s_i))] - \sum_{t=1}^{T} \underset{s_i \in w_m, m=1,2,\ldots,M \{s_1, s_2, \ldots, s_{N_m}\}}{\min} [\log(Pr(o_t | s_i))]}{\sum_{t=1}^{T} \underset{s_i \in w_m, m=1,2,\ldots,M \{s_1, s_2, \ldots, s_{N_m}\}}{\max} [\log(Pr(o_t | s_i))] - \sum_{t=1}^{T} \underset{s_i \in w_m, m=1,2,\ldots,M \{s_1, s_2, \ldots, s_{N_m}\}}{\min} [\log(Prob(o_t | s_i))]}$$

wherein, t is a frame sequence number of a feature vector in the feature vector sequence, $o_t$ is a feature vector of the frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ conditioned on the state $s_i$, $$\sum_{t=1}^{T} \underset{s_i \in w_m, m=1,2,\ldots,M \{s_1, s_2, \ldots, s_{N_m}\}}{\max} [\log(Pr(o_t | s_i))]$$

is the overall maximum reference score, $$\sum_{t=1}^{T} \underset{s_i \in w_m\{s_1, s_2, \ldots, s_{N_m}\}}{\text{optimal}} [\log(Pr(o_t | s_i))]$$

is the optimal path score, and $$\sum_{t=1}^{T} \underset{s_i \in w_m, m=1,2,\ldots,M \{s_1, s_2, \ldots, s_{N_m}\}}{\min} [\log(Prob(o_t | s_i))]$$

is the overall minimum reference score.

When the verification scores such as $CM_0$, $CM_1$, $CM_2$ and $CM_3$ are generated by the verification score generator 150, the results thereof are transmitted to the decision device 160 for verifying the recognized vocabulary. The verification score is compared with a predetermined threshold value so as to accept or reject the recognized vocabulary (step S207). In the disclosure, if the verification score is less than the predetermined threshold value, the recognized vocabulary is accepted and output from the speech recognition system 100. Conversely, the recognized vocabulary is rejected, and the speaker is, for example, requested to re-input the speech signal.

The following simulation test result is obtained by using the method and apparatus of the disclosure, and the technique of the disclosure is compared with the conventional technique such as the garbage normalization and the N-best based confidence. It should be noticed that different predetermined threshold value may influence the decision and result in different false rejection rate (FRR) and false acceptance rate (FAR).

The so-called FRR herein refers to that the vocabulary of the speech signal input by the speaker is one of the model vocabularies, and such vocabulary is in an in-vocabulary set (IV). A measurement method thereof is:

$$FRR = \frac{\text{the number of input speech vocabularies in the } IV \text{ that are correct but being rejected}}{\text{the total number of the input speech vocabularies in the } IV \text{ that are correct}} \times 100\%$$

Conversely, the so-called FAR refers to that the vocabulary of the speech signal input by the speaker is not any of the model vocabularies, and such vocabulary is an out-of-vocabulary set (OOV). A measurement method thereof is:

$$FAR = \frac{\text{the number of accepted input speech vocabularies that are in the } OOV}{\text{the total number of the input speech vocabularies that are in the } OOV} \times 100\%$$

The values of FRR and FAR are the smaller the better, though the two values are varied along with the predetermined threshold value. When the predetermined threshold value is decreased, the FAR is increased and the FRR is decreased. Conversely, when the predetermined threshold is increased, the FRR is increased and the FAR is decreased. Therefore, there exists a trade-off in setting the threshold value. In an actual operation, the threshold value is generally set according to an attribute of an application product. In the present embodiment, the value of the FRR is controlled to compare the disclosure with the conventional techniques. The value of FRR is set to 20%, and tests are respectively performed in a quiet environment and a noisy environment, and obtained test results are averaged. Comparison results of two conventional techniques along with the four verification scores $CM_0$, $CM_1$, $CM_2$ and $CM_3$ of the disclosure are listed below: (Note that the verification scores $CM_2$ and $CM_3$ are scaled by multiplying by 1000 during simulation test for comparison.)

When the garbage normalization is adapted, the average of the FAR is 26.45%, the average of the predetermined threshold value is 3163, and the standard deviation of the predetermined threshold value is 820.

When the N-best based confidence is adapted, the average of the FAR is 51.14%, the average of the predetermined threshold value is 348, and the standard deviation of the predetermined threshold value is 72.

When the verification score is $CM_0$, the average of the FAR is 34.90%, the average of the predetermined threshold value is 983, and the standard deviation of the predetermined threshold value is 40.

When the verification score is $CM_1$, the average of the FAR is 10.40%, the average of the predetermined threshold value is 310, and the standard deviation of the predetermined threshold value is 39.

When the verification score is $CM_2$, the average of the FAR is 6.15%, the average of the predetermined threshold value is 920, and the standard deviation of the predetermined threshold value is 14.

When the verification score is $CM_3$, the average of the FAR is 5.49%, the average of the predetermined threshold value is 970, and the standard deviation of the predetermined threshold value is 3.

According to the above simulation results, when the FRR is set to 20% in both of the quiet and noisy environments, except that the FAR corresponding to the verification score $CM_0$ is higher than that of the garbage normalization, the FARs corresponding to the verification scores $CM_1$, $CM_2$ and $CM_3$ are all lower than those of the conventional techniques. Moreover, the standard deviations of the predetermined threshold values of the verification scores of the disclosure are far lower than those of the predetermined threshold values based on the conventional techniques, wherein the effect corresponding to the verification score $CM_3$ is the most obvious. Namely, the setting of the threshold value is not significantly influenced by different testing environments.

In summary, in the method and apparatus for utterance verification of the disclosure, the reference score accumulator is coupled to the speech recognition device, so as to verify the recognized vocabulary output by the speech recognition device. The verification effects corresponding to the verification scores $CM_0$, $CM_1$, $CM_2$ and $CM_3$ are superior than those based on the conventional techniques, and variances of the predetermined threshold value in different environments are smaller. Moreover, except that the verification score $CM_2$ requires additional storage space and computation time for the garbage model, the other manners are all implemented by using the log-likelihood scores generated during the speech recognition process without a large amount of storage space and computation. Therefore, the technique of the disclosure is not only adapted to a general computation platform such as a personal computer or a high efficient operation processor, etc., it may also be applied to an integrated circuit (IC) having a speech recognition function or a digital signal processor (DSP) integrated to a resource-constrained platform in an embedded system.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for utterance verification adapted to verify a recognized vocabulary, wherein the recognized vocabulary is obtained by performing speech recognition on a feature vector sequence according to an acoustic model and model vocabulary database, wherein the feature vector sequence comprises feature vectors of a plurality of frames, wherein the acoustic model and model vocabulary database comprises a plurality of model vocabularies, wherein each of the model vocabularies comprises a plurality of states, and wherein the method for utterance verification comprises:

calculating a maximum reference score for each of the model vocabularies according to a log-likelihood score obtained from speech recognition, wherein the log-likelihood score obtained from speech recognition is calculated by taking a logarithm on a value of a probability of one of the feature vectors of the frames conditioned on one of the states of each model vocabulary, and wherein the maximum reference score is a summation of the maximum value of log-likelihood scores of the feature vector of each frame conditioned on each state of a certain model vocabulary;

calculating a first verification score according to an optimal path score output during the speech recognition and the maximum reference score; and comparing the first verification score with a first predetermined threshold value, so as to reject or accept the recognized vocabulary.

2. The method for utterance verification as claimed in claim 1, wherein an equation for calculating the first verification score is:

$$CM_0 = \frac{\sum_{t=1}^{T} \max_{s_i \in w_m\{s_1,s_2,\cdots,s_{N_m}\}} [\log(Pr(o_t|s_i))] - \sum_{t=1}^{T} \text{optimal}_{s_i \in w_m\{s_1,s_2,\cdots,s_{N_m}\}} [\log(Pr(o_t|s_i))]}{T},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, log$(Pr(o_t|s_i))$ is a log-likelihood score of the feature vector $o_t$ conditioned on the state $s_i$, $$\sum_{t=1}^{T} \max_{s_i \in w_m\{s_1,s_2,\cdots,s_{N_m}\}} [\log(Pr(o_t|s_i))]$$

is the maximum reference score corresponding to the model vocabulary m, and $$\sum_{t=1}^{T} \text{optimal}_{s_i \in w_m\{s_1,s_2,\cdots,s_{N_m}\}} [\log(Pr(o_t|s_i))]$$

is the optimal path score.

3. A method for utterance verification adapted to verify a recognized vocabulary, wherein the recognized vocabulary is obtained by performing speech recognition on a feature vector sequence according to an acoustic model and model vocabulary database, wherein the feature vector sequence comprises feature vectors of a plurality of frames, wherein the acoustic model and model vocabulary database comprises a plurality of model vocabularies, wherein each of the model vocabularies comprises a plurality of states, and wherein the method for utterance verification comprises:

calculating an overall maximum reference score according to a log-likelihood score obtained from speech recognition, wherein the log-likelihood score obtained from speech recognition is calculated by taking a logarithm on a value of a probability of one of the feature vectors of the frames conditioned on one of the states of each model vocabulary, and wherein the overall maximum reference score is a summation of the maximum value of log-likelihood scores of the feature vector of each frame conditioned on each state of each of the model vocabularies;

calculating a second verification score according to an optimal path score output during the speech recognition and the overall maximum reference score; and comparing the second verification score with a second predetermined threshold value, so as to reject or accept the recognized vocabulary.

4. The method for utterance verification as claimed in claim 3, wherein an equation for calculating the second verification score is:

$$CM_1 = \frac{\sum_{t=1}^{T} \max_{s_i \in w_{m,m=1,2,\cdots,M}\{s_1,s_2,\cdots,s_{N_m}\}} [\log(Pr(o_t|s_i))] - \sum_{t=1}^{T} \text{optimal}_{s_i \in w_m\{s_1,s_2,\cdots,s_{N_m}\}} [\log(Pr(o_t|s_i))]}{T},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector or obtained conditioned on the state $s_i$, $$\sum_{t=1}^{T} \max_{s_i \in w_{m,m=1,2,\cdots,M}\{s_1,s_2,\cdots,s_{N_m}\}} [\log(Pr(o_t|s_i))]$$

is the overall maximum reference score, and $$\sum_{t=1}^{T} \text{optimal}_{s_i \in w_m\{s_1,s_2,\cdots,s_{N_m}\}} [\log(Pr(o_t|s_i))]$$

is the optimal path score.

5. The method for utterance verification as claimed in claim 3 further comprising:

calculating a garbage score according to a garbage model, wherein the garbage score is obtained by taking a logarithm on a value of a probability of one of the feature vectors conditioned on a state of the garbage model;

calculating a third verification score according to the optimal path score, the garbage score and the overall maximum reference score; and comparing the third verification score with a third predetermined threshold value, so as to reject or accept the recognized vocabulary.

6. The method for utterance verification as claimed in claim 5, wherein an equation for calculating the third verification score is:

$$CM_2 = \frac{\sum_{t=1}^{T} \underset{s_i \in w_m\{s_1,s_2,\ldots,s_{N_m}\}}{\text{optimal}} [\log(Pr(o_t|s_i))] - \sum_{t=1}^{T} \text{optimal}[\log(Pr(o_t|\lambda_g))]}{\sum_{t=1}^{T} \underset{s_i \in w_m, m=1,2,\ldots,M\{s_1,s_2,\ldots,s_{N_m}\}}{\max} [\log(Pr(o_t|s_i))] - \sum_{t=1}^{T} \text{optimal}[\log(Pr(o_t|\lambda_g))]},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $\lambda_g$ is a state of the garbage model, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ conditioned on the state $s_i$, $\log(Pr(o_t|\lambda_g))$ is a log-likelihood score of the feature vector $o_t$ conditioned on the state of the garbage model, $$\sum_{t=1}^{T} \underset{s_i \in w_m, m=1,2,\ldots,M\{s_1,s_2,\ldots,s_{N_m}\}}{\max} [\log(Pr(o_t|s_i))]$$

is the overall maximum reference score, $$\sum_{t=1}^{T} \underset{s_i \in w_m\{s_1,s_2,\ldots,s_{N_m}\}}{\text{optimal}} [\log(Pr(o_t|s_i))]$$

is the optimal path score, and $$\sum_{t=1}^{T} \text{optimal}[\log(Pr(o_t|\lambda_g))]$$

is the garbage score.

7. The method for utterance verification as claimed in claim 3 further comprising:
calculating an overall minimum reference score, wherein the overall minimum reference is a summation of the minimum value of log-likelihood scores of the feature vector of each frame conditioned on each state of each of the model vocabularies;
calculating a fourth verification score according to the optimal path score, the overall maximum reference score and the overall minimum reference score; and
comparing the fourth verification score with a fourth predetermined threshold value, so as to reject or accept the recognized vocabulary.

8. The method for utterance verification as claimed in claim 7, wherein an equation for calculating the fourth verification score is:

$$CM_3 = \frac{\sum_{t=1}^{T} \underset{s_i \in w_m\{s_1,s_2,\ldots,s_{N_m}\}}{\text{optimal}} [\log(Pr(o_t|s_i))] - \sum_{t=1}^{T} \underset{s_i \in w_m, m=1,2,\ldots,M\{s_1,s_2,\ldots,s_{N_m}\}}{\min} [\log(Pr(o_t|s_i))]}{\sum_{t=1}^{T} \underset{s_i \in w_m, m=1,2,\ldots,M\{s_1,s_2,\ldots,s_{N_m}\}}{\max} [\log(Pr(o_t|s_i))] - \sum_{t=1}^{T} \underset{s_i \in w_m, m=1,2,\ldots,M\{s_1,s_2,\ldots,s_{N_m}\}}{\min} [\log(Prob(o_t|s_i))]},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ obtained conditioned on the state $s_i$, $$\sum_{t=1}^{T} \underset{s_i \in w_m, m=1,2,\ldots,M\{s_1,s_2,\ldots,s_{N_m}\}}{\max} [\log(Pr(o_t|s_i))]$$

is the overall maximum reference score, $$\sum_{t=1}^{T} \underset{s_i \in w_m\{s_1,s_2,\ldots,s_{N_m}\}}{\text{optimal}} [\log(Pr(o_t|s_i))]$$

is the optimal path score, and $$\sum_{t=1}^{T} \underset{s_i \in w_m, m=1,2,\ldots,M\{s_1,s_2,\ldots,s_{N_m}\}}{\min} [\log(Prob(o_t|s_i))]$$

is the overall minimum reference score.

9. An apparatus for utterance verification adapted to verify a recognized vocabulary output by a speech recognition device, wherein the recognized vocabulary is obtained by performing speech recognition on a feature vector sequence according to an acoustic model and model vocabulary database, wherein the feature vector sequence comprises feature vectors of a plurality of frames, wherein the acoustic model and model vocabulary database comprises a plurality of model vocabularies, wherein each of the model vocabularies comprises a plurality of states, and wherein the apparatus for utterance verification comprises:
a reference score accumulator coupled to the speech recognition device and adapted to calculate a maximum reference score for each of the model vocabularies according to a log-likelihood score obtained from the speech recognition device by taking a logarithm on a value of a probability of one of the feature vectors of the frames conditioned on one of the states of each model vocabulary, wherein the maximum reference score is a summation of the maximum value of log-likelihood scores of the feature vector of each frame conditioned on each state of a certain model vocabulary;

a verification score generator coupled to the reference score accumulator and adapted to calculate a first verification score according to an optimal path score output from the speech recognition device and the maximum reference score; and a decision device coupled to the verification score generator and adapted to compare the first verification score with a first predetermined threshold value, so as to reject or accept the recognized vocabulary.

10. The apparatus for utterance verification as claimed in claim 9, wherein an equation for calculating the first verification score is:

$$CM_0 = \frac{\sum_{t=1}^{T} \max_{s_i \in w_m\{s_1,s_2,\ldots,s_{N_m}\}}[\log(Pr(o_t|s_i))] - \sum_{t=1}^{T} \underset{s_i \in w_m\{s_1,s_2,\ldots,s_{N_m}\}}{\text{optimal}}[\log(Pr(o_t|s_i))]}{T},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, log $(Pr(o_t|s_i))$ is a log-likelihood score of the feature vector $o_t$ conditioned on the state $s_i$, $$\sum_{t=1}^{T} \max_{s_i \in w_m\{s_1,s_2,\ldots,s_{N_m}\}}[\log(Pr(o_t|s_i))]$$

is the maximum reference score corresponding to the model vocabulary m, and $$\sum_{t=1}^{T} \underset{s_i \in w_m\{s_1,s_2,\ldots,s_{N_m}\}}{\text{optimal}}[\log(Pr(o_t|s_i))]$$

is the optimal path score.

11. An apparatus for utterance verification adapted to verify a recognized vocabulary output by a speech recognition device, wherein the recognized vocabulary is obtained by performing speech recognition on a feature vector sequence according to an acoustic model and model vocabulary database, wherein the feature vector sequence comprises feature vectors of a plurality of frames, wherein the acoustic model and model vocabulary database comprises a plurality of model vocabularies, wherein each of the model vocabularies comprises a plurality of states, and wherein the apparatus for utterance verification comprises:

a reference score accumulator coupled to the speech recognition device and adapted to calculate an overall maximum reference score according to a log-likelihood score obtained from the speech recognition device by taking a logarithm on a value of a probability of one of the feature vectors of the frames conditioned on one of the states of each model vocabulary, wherein the overall maximum reference score is a summation of the maximum value of log-likelihood scores of the feature vector of each frame conditioned on each state of each of the model vocabularies;

a decision device coupled to the reference score accumulator and adapted to calculate a second verification score according to an optimal path score output by the speech recognition device and the overall maximum reference score;

a verification score generator coupled to the reference score accumulator and adapted to compare the second verification score with a second predetermined threshold value, so as to reject or accept the recognized vocabulary.

12. The apparatus for utterance verification as claimed in claim 11, wherein an equation for calculating the second verification score is:

$$CM_1 = \frac{\sum_{t=1}^{T} \max_{s_i \in w_m, m=1,2,\ldots,M\{s_1,s_2,\ldots,s_{N_m}\}}[\log(Pr(o_t|s_i))] - \sum_{t=1}^{T} \underset{s_i \in w_m\{s_1,s_2,\ldots,s_{N_m}\}}{\text{optimal}}[\log(Pr(o_t|s_i))]}{T},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ obtained conditioned on the state $s_i$, $$\sum_{t=1}^{T} \max_{s_i \in w_m, m=1,2,\ldots,M\{s_1,s_2,\ldots,s_{N_m}\}}[\log(Pr(o_t|s_i))]$$

is the overall maximum reference score, and $$\sum_{t=1}^{T} \underset{s_i \in w_m\{s_1,s_2,\ldots,s_{N_m}\}}{\text{optimal}}[\log(Pr(o_t|s_i))]$$

is the optimal path score.

13. The apparatus for utterance verification as claimed in claim 11, wherein the reference score accumulator further calculates a garbage score according to a garbage model, wherein the garbage score is obtained by taking a logarithm on a value of a probability of one of the feature vectors conditioned on a state of the garbage model, wherein the verification score generator calculates a third verification score according to the optimal path score, the garbage score and the overall maximum reference score, and wherein the decision device compares the third verification score with a third predetermined threshold value so as to reject or accept the recognized vocabulary.

14. The apparatus for utterance verification as claimed in claim 13, wherein an equation for calculating the third verification score is:

$$CM_2 = \frac{\sum_{t=1}^{T} \underset{s_i \in w_m\{s_1, s_2, \ldots, s_{N_m}\}}{\text{optimal}} [\log(Pr(o_t | s_i))] - \sum_{t=1}^{T} \text{optimal}[\log(Pr(o_t | \lambda_g))]}{\sum_{t=1}^{T} \underset{s_i \in w_m, m=1,2,\ldots,M\{s_1, s_2, \ldots, s_{N_m}\}}{\max} [\log(Pr(o_t | s_i))] - \sum_{t=1}^{T} \text{optimal}[\log(Pr(o_t | \lambda_g))]},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $\lambda_g$ is a state of the garbage model, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ obtained conditioned on the state $s_i$, $\log(Pr(o_t|\lambda_g))$ is a log-likelihood score of feature vector $o_t$ conditioned on the state of the garbage model $$\sum_{t=1}^{T} \underset{s_i \in w_m, m=1,2,\ldots,M\{s_1, s_2, \ldots, s_{N_m}\}}{\max} [\log(Pr(o_t | s_i))]$$

is the overall maximum reference score, $$\sum_{t=1}^{T} \underset{s_i \in w_m\{s_1, s_2, \ldots, s_{N_m}\}}{\text{optimal}} [\log(Pr(o_t | s_i))]$$

is the optimal path score, and $$\sum_{t=1}^{T} \text{optimal}[\log(Pr(o_t | \lambda_g))]$$

is the garbage score.

15. The apparatus for utterance verification as claimed in claim 11, wherein the reference score accumulator further calculates an overall minimum reference score, wherein the overall minimum reference score is a summation of the minimum value of log-likelihood scores of the feature vector of each frame conditioned on each state of each of the model vocabularies, wherein the verification score generator calculates a fourth verification score according to the optimal path score, the overall maximum reference score and the overall minimum reference score, and wherein the decision device compares the fourth verification score with a fourth predetermined threshold value so as to reject or accept the recognized vocabulary.

16. The apparatus for utterance verification as claimed in claim 15, wherein an equation for calculating the fourth verification score is:

$$CM_3 = \frac{\sum_{t=1}^{T} \underset{s_i \in w_m\{s_1, s_2, \ldots, s_{N_m}\}}{\text{optimal}} [\log(Pr(o_t | s_i))] - \sum_{t=1}^{T} \underset{s_i \in w_m, m=1,2,\ldots,M\{s_1, s_2, \ldots, s_{N_m}\}}{\min} [\log(Pr(o_t | s_i))]}{\sum_{t=1}^{T} \underset{s_i \in w_m, m=1,2,\ldots,M\{s_1, s_2, \ldots, s_{N_m}\}}{\max} [\log(Pr(o_t | s_i))] - \sum_{t=1}^{T} \underset{s_i \in w_m, m=1,2,\ldots,M\{s_1, s_2, \ldots, s_{N_m}\}}{\min} [\log(Pr(o_t | s_i))]},$$

wherein, t is a frame sequence number of a feature vector in the feature vector sequence, $o_t$ is a feature vector of a frame with the sequence number t, T is a total frame number of the feature vectors, $s_i$ is one of the states of a model vocabulary m, $w_m\{s_1, s_2, \ldots, s_{N_m}\}$ is a set composed of the states of the model vocabulary m, M is a total number of the model vocabularies, $\log(Pr(o_t|s_i))$ is a log-likelihood score of the feature vector $o_t$ obtained conditioned on the state $s_i$, $$\sum_{t=1}^{T} \underset{s_i \in w_m, m=1,2,\ldots,M\{s_1, s_2, \ldots, s_{N_m}\}}{\max} [\log(Pr(o_t | s_i))]$$

is the overall maximum reference score, $$\sum_{t=1}^{T} \underset{s_i \in w_m\{s_1, s_2, \ldots, s_{N_m}\}}{\text{optimal}} [\log(Pr(o_t | s_i))]$$

is the optimal path score, and $$\sum_{t=1}^{T} \underset{s_i \in w_m, m=1,2,\ldots,M\{s_1, s_2, \ldots, s_{N_m}\}}{\min} [\log(Prob(o_t | s_i))]$$

is the overall minimum reference score.

* * * * *